US005993220A

United States Patent [19]

Nakamura et al.

[11] Patent Number: 5,993,220

[45] Date of Patent: Nov. 30, 1999

[54] REMOTE CONTROL DEVICE, SOUND-REPRODUCING SYSTEM AND KARAOKE SYSTEM

[75] Inventors: Junichi Nakamura, Chiba; Hideki Nakano, Kanagawa, both of Japan

[73] Assignee: Sony Corporation, Japan

[21] Appl. No.: 08/785,550

[22] Filed: Jan. 21, 1997

[30] Foreign Application Priority Data

Jan. 24, 1996 [JP] Japan .................................... 8-010368

[51] Int. Cl.$^{6}$ ................................ G10H 1/36; G09B 5/00

[52] U.S. Cl. ................................ 434/307 A; 434/307 R; 84/610; 84/609; 340/825.72

[58] Field of Search ....................... 434/118, 307 R–309, 434/318, 365; 84/477 R, 601, 608–610, 625, 630–634, 645; 369/24, 30, 48, 84, 40; 348/706, 734, 738; 340/825.69, 825.72; 360/5, 15

[56] References Cited

U.S. PATENT DOCUMENTS

| | | | |
|---|---|---|---|
| 5,245,600 | 9/1993 | Yamauchi et al. | 369/49 |
| 5,467,326 | 11/1995 | Miyashita et al. | 369/30 |
| 5,473,106 | 12/1995 | Miyashita et al. | 84/609 |
| 5,621,182 | 4/1997 | Matsumoto | 84/610 |
| 5,624,265 | 4/1997 | Redford et al. | 434/307 R |
| 5,631,433 | 5/1997 | Iida et al. | 434/307 A X |
| 5,663,516 | 9/1997 | Kawashima | 84/610 |
| 5,679,911 | 10/1997 | Moriyama et al. | 84/609 |
| 5,691,494 | 11/1997 | Sai et al. | 434/307 A X |
| 5,703,308 | 12/1997 | Tashiro et al. | 84/609 |
| 5,726,373 | 3/1998 | Choi et al. | 434/307 A X |
| 5,747,716 | 5/1998 | Matsumoto | 84/609 |

*Primary Examiner*—Joe H. Cheng
*Attorney, Agent, or Firm*—Rader, Fishman & Grauer; Ronald P. Kananen

[57] ABSTRACT

A karaoke system is provided with a reproducing section and a remote control device. The reproducing section at least reproduces an accompaniment signal. The remote control device controls the operation of the reproducing section and is provided with an input section, a storage and a sending section. A control signal for controlling the operation of the reproducing section and information showing the order of reproducing an accompaniment signal by the reproducing section are input from the input section. The storage stores reservation information showing the order of reproduction and the personal information of a user both input via the input section. The sending section sends at least one of reservation information and the personal information of a user both stored in said storage to the reproducing section. The reproducing section reproduces an accompaniment signal specified via the input section and the operation of the reproducing section is controlled based upon at least one of personal information and a control signal both sent from the remote control device.

20 Claims, 4 Drawing Sheets

| | ITEM NUMBER | CONTENTS |
|---|---|---|
| — | 0~7 | (DISC ITEM) |
| ESSENTIAL | 8 | SRC CODE OF PIECE |
| ESSENTIAL | 9 | PIECE NAME |
| ARBITRARY | 10 | PIECE NAME (FOR REARRANGEMENT) |
| ESSENTIAL | 11 | SINGER NAME |
| ARBITRARY | 12 | SINGER NAME (FOR REARRANGEMENT) |
| ESSENTIAL | 13 | SONGWRITER |
| ESSENTIAL | 14 | COMPOSER |
| ARBITRARY | 15 | ARRANGER |
| ARBITRARY | 16 | ORIGINAL SINGER NAME |
| ARBITRARY | 17 | HEADER FOR TEXT |
| ARBITRARY | 18 | TEXT |
| ARBITRARY | 19 | SCALE (INTERVAL) OF KERAOKE |
| ARBITRARY | 20 | SCALE OF ORIGINAL |
| ARBITRARY | 21 | DETAILED CONTENTS OF PIECE |
| ARBITRARY | 22~31 | DEFINITION OF MANUFACTURE |
| ARBITRARY | 32~64 | RESERVED AREA |

FIG.4

| | | | |
|---|---|---|---|
| USER ID | RESERVED PIECE INFORMATION RI1 | ---- | RESERVED PIECE INFORMATION RIn |

FIG.5

REMOTE CONTROL DEVICE, SOUND-REPRODUCING SYSTEM AND KARAOKE SYSTEM

BACKGROUND OF THE INVENTION

1. Field of the Invention

The present invention relates to a remote control device of a sound-reproducing system, the sound-reproducing system and a karaoke system described later. Particularly, the present invention relates to a remote control device of a sound-reproducing system provided with a storage, the sound-reproducing system and a karaoke system.

2. Description of the Related Art

At present, so-called karaoke for singing to a reproduced piece of music is popular. A karaoke system is provided with a mixing function for mixing and outputting a reproduced piece of music, that is, an accompaniment and a singer's voice input from a microphone. This karaoke system is classified into a system in which a signal of an accompaniment is reproduced using, for example, a so-called optical video disc, a compact disc (CD) or a disc recording medium such as a so-called video CD in which video data is recorded together with audio data, and into a so-called communication karaoke system which is a system for receiving and storing musical instrument digital interface (MIDI) data sent via a telephone line or a telecommunication line such as an integrated services digital network (ISDN) and reproducing MIDI data according to a selected piece of music.

Heretofore, the middle-aged and old mainly use this karaoke system. However, at present, karaoke is popular among wide age-groups owing to the popularization of a so-called karaoke box, that is, a small room provided with a karaoke system, where a group consisting of a few to some persons can enjoy karaoke. The object of going to karaoke is also varied to a pastime like a party.

A variety of methods for meeting a request of users of this karaoke, that is, preparing pieces of music requested for singing are tried based upon the personal information of users obtained by investigating and examining the situation of the use of karaoke.

Incidentally, it takes much time and costs for the above investigation and examination and it is difficult to utilize the result of these investigation and examination in a market timely. As the subject of the investigation is limited, it is difficult to provide service suited to the request of an individual user including a new user.

In the concrete, karaoke box is so popular that a user often must wait until his turn comes while determining pieces of music to sing and tries to sing as many pieces of music as possible when his turn comes. To sing determined pieces of music during waiting, a user must specify pieces of music by operating a operating a karaoke system after the use of the karaoke box is allowed and cannot sing during operating the karaoke system to specify pieces of music.

Generally, reservation for registered pieces of music to be sung beforehand is enabled in a karaoke system. As only a fixed number of pieces of music can be reserved, to reserve pieces of music of a number exceeding a fixed number, reservation of times equivalent to the number is required.

SUMMARY OF THE INVENTION

It is therefore an object of the present invention to provide a remote control device of a sound-reproducing system which resolves the above-mentioned problem.

It is another object of the present invention to provide a sound-reproducing system which resolves the above-mentioned problem.

It is a further object of the present invention to provide a karaoke system which resolves the above-mentioned problem.

According to the present invention, there is provided a remote control device of a sound-reproducing system for controlling the operation of the above sound-reproducing system including an input section for inputting a control signal for controlling the operation of the above sound-reproducing system and information showing the order of the reproduction of at least an audio signal by the above sound-reproducing system, a storage for storing the above information showing the order of the reproduction input from the above input section and the personal information of a user and a transmitting section for transmitting at least one of the information showing the order of the reproduction and the personal information of the above user both stored in the above storage to the above sound-reproducing system.

According to the present invention, there is provided a sound-reproducing system including a reproducing section and a remote control section. At least an audio signal is reproduced by the reproducing section. The remote control section controls the operation of the reproducing section and is provided with an input section, a storage and a transmitting section. A control signal for controlling the operation of the reproducing section and information showing the order of the reproduction of an audio signal by the reproducing section are input from the input section. The storage stores the information showing the order of the reproduction input from the input section and the personal information of a user. The transmitting section transmits at least one of the information showing the order of the reproduction and the personal information of the user both stored in the storage to the reproducing section. The reproducing section reproduces an audio signal specified via the input section and the operation is controlled based upon at least one of the personal information and a control signal both transmitted from the remote control section.

According to the present invention, there is provided a karaoke system including a reproducing section and a remote control section. The reproducing section reproduces at least a signal of an accompaniment. The remote control section controls the operation of the reproducing section and is provided with an input section, a storage and a transmitting section. A control signal for controlling the operation of the reproducing section and information showing the order of the reproduction of a signal of an accompaniment by the reproducing section are input from the input section. The storage stores the reservation information showing the order of the reproduction and the personal information of a user both input from the input section. The transmitting section transmits at least one of the reservation information and the personal information of the user both stored in the storage to the reproducing section. The reproducing section reproduces a signal of an accompaniment specified from the input section and the operation is controlled based upon at least one of the personal information and the control signal transmitted from the remote control section.

BRIEF DESCRIPTION OF THE DRAWINGS

FIG. 4 shows a schematic format of a sequence item table; and

FIG. 5 shows a schematic format of the information of reserved pieces of music.

DESCRIPTION OF THE PREFERRED EMBODIMENTS

Figure 1:
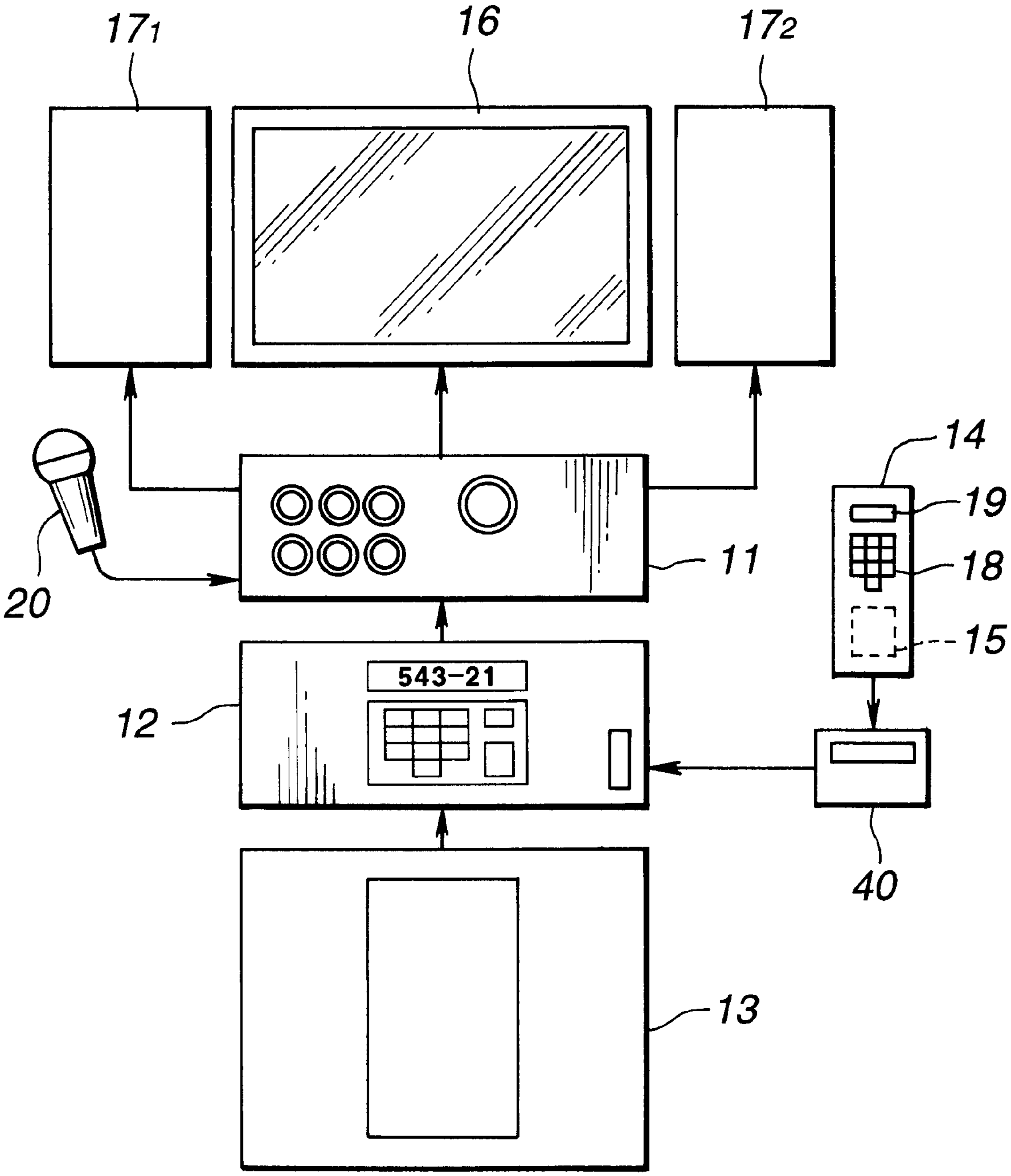
FIG. 1 is a schematic diagram showing a karaoke system equivalent to an embodiment according to the present invention.

Referring to the drawings, a sound-reproducing system according to the present invention will be described in detail below. In the embodiments of the present invention described below, a karaoke system will be described as an example of the sound-reproducing system.

Figure 2:
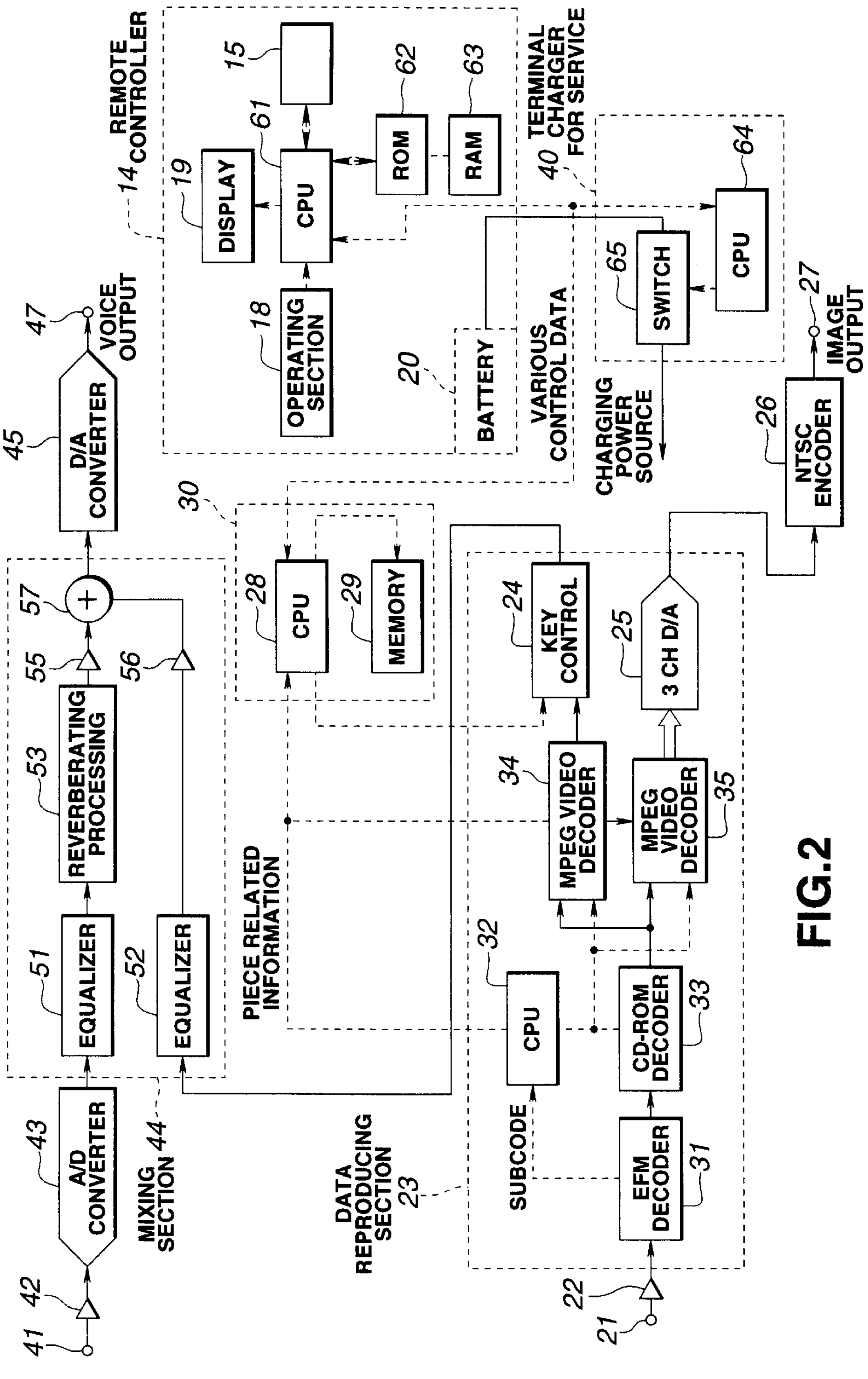
FIG. 2 is a block diagram showing the constitution of the karaoke system equivalent to the embodiment according to the present invention.

FIG. 1 shows the schematic constitution of a karaoke system and FIG. 2 shows the schematic constitution of the karaoke system consisting of a remote controller 14, a terminal charger 40 for service and a controller 12.

This remote controller 14 is provided with an operating section 18 for inputting a control signal for controlling the operation of an accompaniment reproducing system and reservation information showing the order of the output of the accompaniment information of pieces of music, a storage for storing the reservation information and personal information related to a user and CPU 61 for transmitting the reservation information and the personal information both stored in the storage to a performance-reproducing system.

The above personal information means information related to reproduction by the performance-reproducing system. The above accompaniment information means performed music described later and a singing voice.

The remote controller 14 is provided with a display 19 for displaying reservation information input from the operating section 18.

The storage provided to the remote controller 14 is constituted by RAM 63 for storing reservation information and a personal information storage 15 for storing personal information. The karaoke system is constituted by an amplifier 11, a controller 12, a disc changer 13, a TV monitor 16, speakers $\mathbf{17}_1$ and $\mathbf{17}_2$ and a microphone 20 as shown in FIG. 1.

In this karaoke system, after a user checks the number of a desired piece of music in a so-called index book showing for example, the names of plural pieces of music and the numbers corresponding to these names, he/she operates buttons provided to the controller 12 or buttons in the operating section 18 of the remote controller 14 and specifies the number of his/her desired piece of music. Hereby, in the disc changer 13 in which plural video CDs are housed, a video CD in which a specified piece of music is recorded is brought out of a housing and the audio data and video data of the specified piece of music are read by the disc reproducing section.

The audio data and video data read by the disc reproducing section of the disc changer 13 are supplied to the controller 12, a signal is processed by the controller 12 and demodulated or decoded audio signal and video signal can be obtained. The singing voice of a user input from the microphone 20 is sent to the controller 12 via the amplifier 11. In the controller 12, the singing voice input from the microphone 20 and the demodulated or decoded audio signal are mixed. This mixed signal is respectively output from the speakers $\mathbf{17}_1$ and $\mathbf{17}_2$ as accompaniment music and a singing voice via the amplifier 11. Simultaneously, a video signal from the controller 12 is output to a television monitor, that is, a so-called TV monitor 16 as a television signal and an image synchronized with an accompaniment is displayed.

Figures 3A, 3B, 3C:
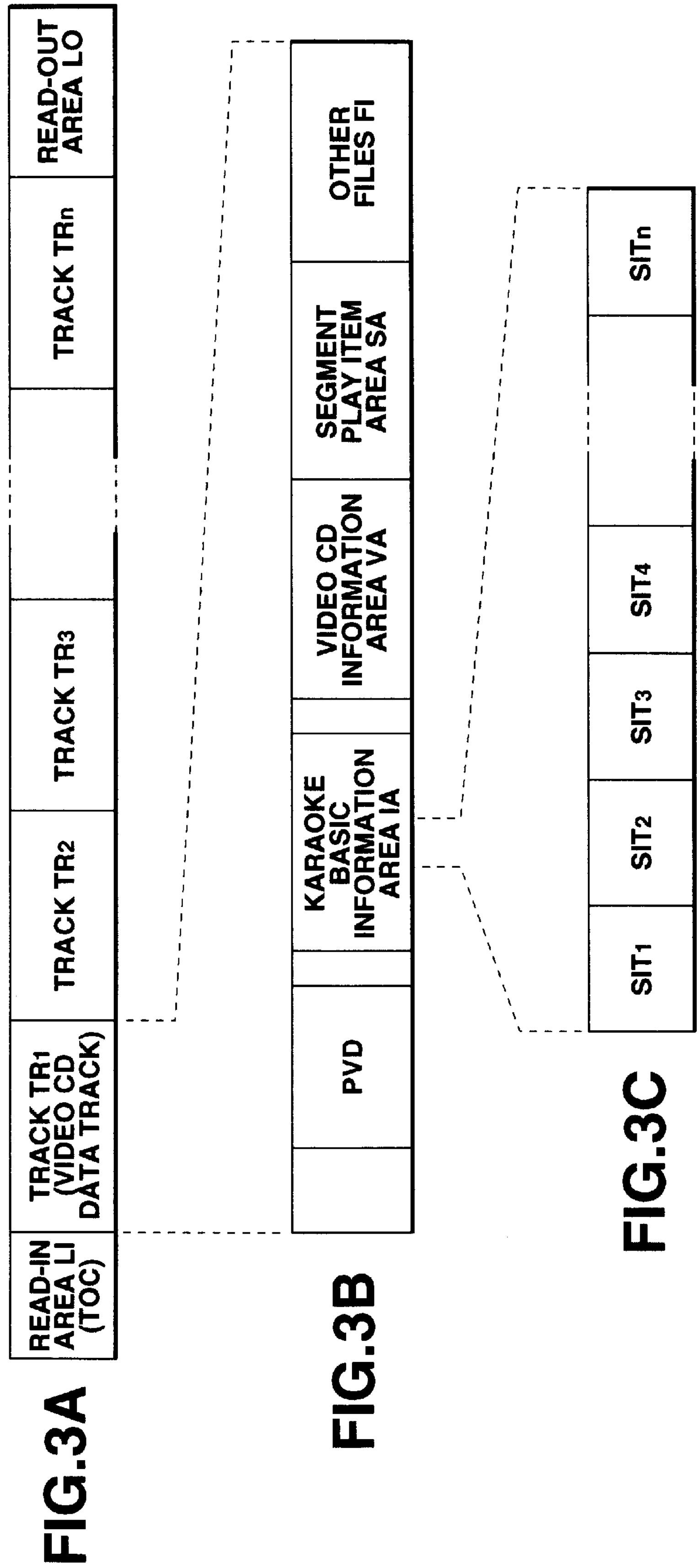
FIGS. 3A, 3B and 3C respectively show a schematic format of the tracks of a video CD.

FIGS. 3A to 3C show the format of tracks of a video CD.

In a video CD, a read-in area LI is provided on the innermost side as shown in FIG. 3A and here, table of contents (TOC) data which is index information is recorded. For TOC data, the start position of each track, the number of tracks and the time of performance are recorded.

Data is recorded in tracks $TR_1$, to $TR_n$ next to the read-in area LI and a read-out area LO is provided on the outermost side.

However, the track $TR_1$ is not used for recording video data and audio data as the first track and used as a video CD data track.

In tracks $TR_2$ to $TR_n$, video data and audio data are recorded. That is, in the tracks $TR_2$ to $TR_n$, a video sector and an audio sector are recorded in a time sharing mode. The constitution of sectors is not shown, however, a video sector and an audio sector are arranged in the ratio of approximately 6 to 1 on average. In a video sector, video data called pictures I, P and B which are compressed and encoded according to a so-called motion picture experts group (MPEG) which is high efficiency compression coding of video data is recorded. In an audio sector, audio data encoded according to MPEG is recorded.

In a video CD, the maximum number of tracks is 99. Therefore, in the case of a video CD, maximum 98 sequences can be recorded. A sequence means a block of continuous animation and in case an image is recorded as in karaoke, one piece of music, that is, one track is equivalent to one sequence.

In a video CD data track of the track $TR_1$, as shown in FIG. 3B, a primary volume descriptor (PVD), a karaoke basic information area IA, a video CD information area VA, a segment play item area SA and other files Fl such as a CD-I application program are prepared.

In a so-called video CD for karaoke, a variety of information, for example the information of each piece of music recorded in the track $TR_2$ or later can be recorded in the karaoke basic information area IA.

The data of each piece of music is recorded as sequence item tables $SIT_1$ to $SIT_n$ in the karaoke basic information area IA as shown in FIG. 3C. One sequence item table SIT is provided to each piece of music. The value of 'n' is equivalent to the number of recorded pieces of music.

FIG. 4 shows the format of a sequence item table SIT and essential or arbitrary information is recorded corresponding to 64 item numbers.

Particularly, item numbers 8 to 64 are an area corresponding to pieces of music and a variety of information, for example the names of a piece of music, a performing musician, a songwriter and a composer are recorded. The item numbers 22 to 31 are an area which the manufacturer of a disc can use arbitrarily.

As described above, the remote controller 14 is provided with the operating section 18 consisting of plural keys and the display 19 consisting of a liquid crystal panel or others and is set on the terminal charger 40 for service. It is desirable that each user has this remote controller 14.

For the power source of the remote controller 14, a battery charger 20 as a secondary cell is used. This battery charger 20 is charged by the terminal charger 40 for service.

This terminal charger 40 for service charges the battery charger 20 for the remote controller 14 and transmits a signal such as data output by operating the operating section 18 of the remote controller 14 to the controller 12. Reproduced piece related information is output from the controller 12 and is transmitted to the remote controller 14 via this terminal charger 40 for service.

For example, when a small quantity of normal data such as the reservation of a piece of music is transmitted/received between the controller 12 and the remote controller 14, the remote controller 14 is used as a wireless remote controller and data is directly transmitted/received between the remote controller 14 and the controller 12. When a large quantity of data such as piece related information is transmitted/received, the remote controller 14 is required to be set on the terminal charger 40 for service to transmit/receive data.

As described above, the remote controller 14 is provided with the personal information storage 15. The personal information storage 15 consists of a nonvolatile IC memory and personal information related to karaoke is stored. This personal information is utilized together with piece related information recorded in the sequence item table SIT in a video CD. The personal information storage 15 may be also a card which can be inserted or ejected into/from the remote controller 14.

Table 1 shows personal information stored in the personal information storage 15.

TABLE 1

| | |
|---|---|
| (PP-M0) | Favorite pieces (within 16) |
| (PP-M1) | Names of musician composer and arranger |
| (PP-M2) | Date of release |
| (PP-M3) | Range of voice |
| (PP-M4) | Tune and tempo |
| (PP-M5) | Category of piece |
| (PP-MP0) | User membership number |
| (PP-MP1) | Name, birth date and sex of user (owner of this card) |
| (PP-MP2) | Singable range of voice |
| (PP-MP3) | Favorite music category |
| (PP-MP4) | Formerly sung pieces (newest 32) and scores |
| (PP-MP5) | Numbers of pieces of highest and lowest scores and scores |
| (PP-MP6) | Balance of prepaid card |

As described above, for personal information, the information of a user's favorite pieces of music is stored in an item PP-M0, the user's membership number in an item PP-MP0, the user's name, birth date and sex in an item PP-MP1, the user's singable range of a voice in an item PP-MP2, the user's favorite category of music in an item PP-MP3, the names and scores of pieces which the user formerly sang in an item PP-MP4, the numbers and scores of pieces of the highest and lowest scores of pieces sung by the user in an item PP-MP5 and the balance after the user utilizes a karaoke box is stored in an item PP-MP6. As each variable PP-M1 to PP-M5 of a favorite piece can be referred from a sequence item table SIT in a video CD based upon the number of the favorite piece, only the number of a favorite piece may be stored in the personal information storage 15. The balance stored in the item PP-MP6 is subtracted based upon the number of sung pieces every time one piece of music is finished or when a charge is cleared off and the result of the subtraction is displayed on the TV monitor 16 or the display 19.

Sixteen favorite pieces and the newest 32 pieces formerly sung can be stored as personal information as shown in Table 1, however, the number of such pieces which can be stored as personal information is not limited to the above numbers and is suitably varied depending upon the memory capacity of the storage 15.

Next, referring to FIG. 2, the output processing of accompaniment information by a sound-reproducing system and reservation by a remote control device will be described. In FIG. 2, a control signal is shown by a dotted line, and an audio signal and a video signal are shown by a full line.

Audio data reproduced from a video CD is sound multiplex data, for example so-called music data which is an accompaniment is multiplexed in the left channel (Lch) and the voice of a singer is multiplexed in the right channel (Rch). A signal read from a video CD including audio data and video data is input from an input terminal 21 and sent to a data reproducing section 23 via an amplifier 22.

In an EFM decoder 31 of the data reproducing section 23, EFM demodulation and error correction processing are applied to an input signal. Control information hereby obtained, in the concrete subcode information is sent to CPU 32 which is a central processing unit. Audio data and video data are sent to a CD-ROM decoder 33. This subcode information means the progress time information of a piece of music, is equivalent to one piece of music, that is, an address in one track and is shown in the form of min./sec./frame. CPU 32 sends a control signal to a MPEG audio decoder 34 and a MPEG video decoder 35 based upon the sent control information and sends piece related information to a key control circuit 24 and CPU 28.

In the CD-ROM decoder 33, audio data and video data are decoded according to a CD-ROM system. Audio data hereby reproduced is sent to the MPEG audio decoder 34 and reproduced video data is sent to the MPEG video decoder 35.

In the MPEG video decoder 35, video data compressed and encoded according to a MPEG system is decoded and signals R, G and B are obtained. These signals R, G and B are respectively sent to a 3-channel digital-to-analog (D/A) converter 25, are respectively converted to an analog signal and are supplied to an NTSC encoder 26 via a display controller 29. In this NTSC encoder 26, the supplied analog signals are converted to a composite video signal according to the NTSC system. This composite video signal is output from an output terminal 27, is sent to the TV monitor 16 shown in FIG. 1 via the amplifier 11 and as a result, an image is displayed.

In the MPEG audio decoder 34, audio data compressed and encoded according to the MPEG system is decoded and digital reproduced voice data is output. This digital reproduced voice data is supplied to the key control circuit 24.

In the key control circuit 24, if necessary, accompaniment key conversion processing is applied to accompaniment information so that a user can sing at ease and as a result, the musical interval of an accompaniment is adjusted. Accompaniment data the musical interval of which is adjusted is sent to a mixing section 44.

Frequency characteristic change processing is applied to accompaniment data sent from the key control circuit 24 by an equalizer 52 of the mixing section 44 and supplied to a mixer 57 via an amplifier 56.

In the meantime, a microphone 20 is connected to an input terminal 41. A user's singing voice is input from this input terminal 41 and after the voice is converted into digital voice data by an analog-to-digital (A/D) converter 43 via a microphone amplifier 42, it is sent to the mixing section 44. Frequency characteristic change processing is applied to the digital voice data by an equalizer 51 of the mixing section 44. After reverberations are added to the digital voice data to which this frequency characteristic change processing is applied in a reverberation processing circuit 53, the digital voice data is supplied to the mixer 57 via an amplifier 55.

In the mixer 57, digital voice data based upon a user's voice via the amplifier 55 and accompaniment data via the amplifier 56 are mixed. After the mixed digital data is converted to an analog signal by the D/A converter 45, it is output from an output terminal 47 and is respectively output from the speakers $17_1$, and $17_2$ via the amplifier 11.

The remote controller 14 is provided with CPU 61 for controlling a signal, ROM 62 which is a read only memory and RAM 63 which is a memory for reading and writing data in addition to the above operating section 18, the display 19 and the personal information storage 15. CPU 61 controls according to a program stored in ROM 62, and reads and writes data from/to the personal information storage 15 or RAM 62 according to the operation of the operating section 18. CPU controls so that data stored in the personal information storage 15 and data such as the number and title of a piece of music reserved by the operating section 18 are displayed on the display 19 by operating the operating section 18.

A signal such as data read by CPU 61 is sent to CPU 28 in a data control section 30 via CPU 64 for controlling the terminal charger 40 for service when the remote controller 14 is set on the terminal charger 40 for service and the above signal is directly sent to CPU 28 when the remote controller 14 is not set on the terminal charger 40 for service. Hereby, CPU 28 instructs so that the sent data is stored in a memory 29 and controls the processing of each service using this stored data. Each service will be described later.

CPU 28 sends piece related information reproduced in the data reproducing section 23 to CPU 61 of the remote controller 14 via CPU 64 of the terminal charger 40 for service when the remote controller 14 is set on the terminal charger 40 for service and directly sends the above piece related information to CPU 61 when the remote controller 14 is not set on the terminal charger 40 for service.

The terminal charger 40 for service sends a signal sent from the remote controller 14 to CPU 28 under the control of CPU 64 and controls switching of a switch 65 to charge a battery 20 built in the remote controller.

Next, the service of an input for reserving a piece of music will be described.

This service of an input for reserving a piece of music means service of reproducing the accompaniment information of pieces of music in the reserved order of the pieces of music the number of which is beforehand input via the remote controller 14 so that the accompaniment information of a user's desired piece of music is output in a desired order in a room provided with a karaoke system. This reservation input operation can be performed during waiting for a karaoke box provided with the above karaoke system or others to become vacant.

In the concrete, for this reservation input operation, the reservation input number of a piece is checked referring to an index book or others and is input via the operating section 18 of the remote controller 14. For example, if the reservation input number of a piece is "123-01", these five numbers are input in order via the operating section 18 and the input of reservation is completed by operating a key for setting the input of reservation such as a set key finally. If the reservation of plural pieces of music is input, the above reservation input operation is repeated.

Afterward, when a room provided with a karaoke system is allowed to be used, the input reserved numbers of pieces of music are sent to the controller 12 by operating a key provided to the operating section 18 such as a "transfer" key for sending data.

This controller 12 controls based upon the numbers of pieces of music sent from the remote controller 14 so that the accompaniment information of a piece of music is output in the input reserved order.

As described above, when a user is waiting for a karaoke box to become vacant, the numbers of pieces of music to be sung can be also input and when the karaoke box is used, the numbers of plural pieces of music can be transferred collectively to a karaoke system.

Next, the service of an input for reserving a piece of music and of identifying a user will be described.

This service of identifying a user means service of outputting a massage for guiding the order of pieces to a member who inputs reservation when a karaoke system is used because in the above reservation input operation, a membership number which is the identification information of a user is also transferred together with the numbers of pieces. In this reservation input operation, the same reservation input operation as in the above reservation input service is also performed.

To execute this service of identifying a user, the membership number of a user, that is, user identification data (ID) is required to be sent to the controller 12 together with the input reserved numbers of pieces for example by operating a dedicated key provided to the operating section 18 of the remote controller 14 when a karaoke box is used. In the concrete, if the reservation of "n" pieces of music is input, reserved pieces information $RI_1$ to $RI_n$, at the head of which user ID is stored as shown in FIG. 5 is sent to the controller 12 as one group, that is, a packet.

The accompaniment information of pieces of music is reproduced in the input reserved order by control based upon the numbers of pieces sent from the remote controller 14 by this controller 12. The controller 12 controls so that a message for guiding the order of pieces is output to a user who inputs the reservation of a piece of music while the accompaniment information is output.

In the concrete, if the name of a user is Taro Yamada, user ID is "00101", the reservation input number of a reserved piece is "39-12" and reserved piece information with the name of a piece of "0000" is sent to the controller 12, messages "Mr. Yamada, your turn will come soon" and "your piece is "39-12 0000" are displayed on the TV monitor 16 every one minute in one minute or more after the accompaniment information of a piece before this reserved piece "0000" is output.

When the output of the accompaniment information of the reserved piece "0000" is started, messages "Mr. Yamada with the membership number of 00101 sings" and "His piece is "39-12 0000" are displayed on the TV monitor 16.

A memory card in which personal information is stored and a disc recording medium in which a digital signal can be recorded may be used in a karaoke system.

The above karaoke system is provided with a disc changer 13 and the accompaniment information of a piece of music recorded in a video CD housed in this disc changer 13 is reproduced, however, the present invention may be applied to a communication karaoke system which receives MIDI data as accompaniment information via communication equipment.

As clear from the above description, as a karaoke system according to the present invention sends reservation information showing the output order of the accompaniment information of pieces of music to a sound-reproducing system together with the personal information of a user, a user can sing more pieces of music by a simple operation using the karaoke system.

What is claimed is:

1. A remote control device of a sound-reproducing system for controlling the operation of the sound-reproducing system, said device comprising:

an input section for inputting a control signal for controlling the operation of said sound-reproducing system and information showing the order of reproducing at least an audio signal by said sound-reproducing system;

a storage for storing the information input from said input section for showing said reproducing order and the personal information of a user; and a sending section for sending at least one of the information showing said reproducing order and said personal information of a user both stored in said storage to said sound-reproducing system.

2. A remote control device of a sound-reproducing system according to claim 1, wherein:

personal information stored in said storage includes at least the identification number of a user.

3. A remote control device of a sound-reproducing system according to claim 2, wherein:

personal information stored in said storage further includes at least information for setting a state in which an audio signal is reproduced by said sound-reproducing system.

4. A remote control device of a sound-reproducing system according to claim 1, wherein:

said system further comprises a display for displaying at least information stored in said storage.

5. A sound-reproducing system comprising:

a reproducing section for regenerating at least an audio signal; and a remote control device provided with an input section for inputting a control signal for controlling the operation of said reproducing section and information showing the order of reproducing an audio signal by said reproducing section, a storage for storing information showing said reproducing order and the personal information of a user both input from said input section and a sending section for sending at least one of information showing said reproducing order and said personal information of a user both stored in said storage to said reproducing section and for controlling the operation of said reproducing section, wherein:

said reproducing section reproduces an audio signal specified via said input section; and the operation of said reproducing section is controlled based upon at least one of personal information and a control signal both sent from said remote control device.

6. A sound-reproducing system according to claim 5, wherein:

said reproducing section comprises a receiving section for receiving information sent from said remote control device and a control section for controlling the operation of said reproducing section based upon output from said receiving section.

7. A sound-reproducing system according to claim 6, wherein:

said control section controls so that an audio signal specified by the personal information of a user sent from said remote control device is reproduced by said reproducing section.

8. A sound-reproducing system according to claim 5, wherein:

said reproducing section further comprises a housing for housing plural recording mediums in each of which plural audio signals are recorded; and said reproducing section takes a recording medium specified by said remote control device out of said housing and reproduces an audio signal specified by said remote control device.

9. A sound-reproducing system according to claim 5, wherein:

personal information stored in said storage includes at least the identification number of a user.

10. A sound-reproducing system according to claim 9, wherein:

personal information stored in said storage further includes at least information for setting a state in which an accompaniment signal is reproduced by said reproducing section.

11. A sound-reproducing system according to claim 5, wherein:

said remote control device further comprises a display for displaying at least information stored in said storage.

12. A karaoke system, comprising:

a reproducing section for reproducing at least an accompaniment signal; and a remote control device provided with an input section for inputting a control signal for controlling the operation of said reproducing section and information showing the order of reproducing an accompaniment signal by said reproducing section, a storage for storing reservation information showing said reproducing order and the personal information of a user both input from said input section and a sending section for sending at least one of said reservation information and the personal information of a user both stored in said storage to said reproducing section and for controlling the operation of said reproducing section, wherein:

said reproducing section reproduces an accompaniment signal specified via said input section; and the operation of said reproducing section is controlled based upon at least one of personal information and a control signal both sent from said remote control device.

13. A karaoke system according to claim 12, wherein:

personal information stored in said storage further includes at least the identification number of a user.

14. A karaoke system according to claim 13, wherein:

personal information stored in said storage further includes at least information for setting a state in which an accompaniment signal is reproduced by said reproducing section.

15. A karaoke system according to claim 12, wherein:

said remote control device further comprises a display for displaying at least information stored in said storage.

16. A karaoke system according to claim 12, wherein:

said reproducing section comprises a receiving section for receiving information sent from said remote control device and a control section for controlling the operation of said reproducing section based upon output from said receiving section.

17. A karaoke system according to claim 16, wherein:

said control section controls so that an accompaniment signal specified by the personal information of a user sent from said remote control device is reproduced by said reproducing section.

18. A karaoke system according to claim 16, wherein:

said reproducing section further comprises a housing for housing plural recording mediums in each of which plural accompaniment signals are recorded; and said reproducing section takes a recording medium specified by said remote control device out of said housing and reproduces an accompaniment signal specified by said remote control device.

19. A karaoke system according to claim 16, wherein:

said control section informs a user of information showing the balance based upon information showing a used amount in personal information stored in said storage.

20. A karaoke system according to claim 12, wherein:

said system further comprises means for informing a user that the reproduction of an accompaniment signal reserved based upon said reservation information by said reproducing section is to be started based upon personal information from said remote control device.

* * * * *